(12) United States Patent
Kanaya et al.

US007985784B2

(10) Patent No.: US 7,985,784 B2
(45) Date of Patent: Jul. 26, 2011

(54) INK SET, AND RECORDING METHOD AND RECORDED MATERIAL USING THE SAME

(75) Inventors: Miharu Kanaya, Azumino (JP); Tetsuya Aoyama, Shiojiu (JP); Masahiro Hanmura, Kawasaki (JP)

(73) Assignee: Seiko Epson Corporation, Tokyo (JP)

( * ) Notice: Subject to any disclaimer, the term of this patent is extended or adjusted under 35 U.S.C. 154(b) by 160 days.

(21) Appl. No.: 11/502,742

(22) Filed: Aug. 11, 2006

(65) Prior Publication Data

US 2007/0037901 A1 Feb. 15, 2007

(30) Foreign Application Priority Data

Aug. 15, 2005 (JP) ................ 2005-235408

(51) Int. Cl.
*C09D 11/00* (2006.01)
*C08L 53/00* (2006.01)
*C08J 3/02* (2006.01)
*C08K 9/00* (2006.01)

(52) U.S. Cl. ........ 523/160; 524/501; 524/505; 523/200; 523/205

(58) Field of Classification Search ................ 523/160, 523/161, 200, 205; 347/100; 524/853, 547, 524/501, 505
See application file for complete search history.

(56) References Cited

U.S. PATENT DOCUMENTS

| | | | | |
|---|---|---|---|---|
| 6,498,222 B1 * | 12/2002 | Kitamura et al. | .......... | 526/307.2 |
| 6,602,333 B2 * | 8/2003 | Miyabayashi | ............ | 106/31.27 |
| 2003/0008938 A1 * | 1/2003 | Sano et al. | .................... | 523/160 |
| 2003/0045627 A1 * | 3/2003 | Rosano et al. | ................ | 524/547 |
| 2003/0050362 A1 * | 3/2003 | Sakai et al. | .................... | 523/160 |
| 2003/0069329 A1 * | 4/2003 | Kubota et al. | ................ | 523/160 |
| 2003/0078320 A1 * | 4/2003 | Yatake | ......................... | 523/160 |
| 2003/0107632 A1 * | 6/2003 | Arita et al. | ..................... | 347/100 |
| 2004/0127639 A1 * | 7/2004 | Wang et al. | .................... | 524/853 |
| 2005/0004263 A1 * | 1/2005 | Gould et al. | .................... | 523/160 |
| 2005/0036021 A1 * | 2/2005 | Ito et al. | ........................ | 347/100 |
| 2005/0128272 A1 * | 6/2005 | Morohoshi et al. | ........... | 347/100 |

FOREIGN PATENT DOCUMENTS

| | | |
|---|---|---|
| EP | 1 262 529 | 12/2002 |
| EP | 1 473 338 | 11/2004 |
| EP | 1 524 116 | 4/2005 |
| JP | 8-337748 | 12/1996 |
| JP | 11-209671 | 8/1999 |
| JP | 2001-98195 | 4/2001 |
| JP | 2001-123098 | 5/2001 |
| JP | 2002-294134 | 10/2002 |
| JP | 2002-356637 | 12/2002 |
| JP | 2004-82709 | 3/2004 |
| JP | 2005-41994 | 2/2005 |

OTHER PUBLICATIONS

Stoll et al, "Influence of the emulsion components and preparation method on the laboratory-scale preparation of o/w emulsions containing different types of dispersed phases and/or emulsifiers", Food vol. 46, Issue 4, pp. 294-301 (2002).*
STN Search Report—pp. 12.*
Computer-Generated English Translation of Specification and Claims and Patent Abstracts of Japan of 2005-41994 dated Feb. 17, 2005.
Computer-Generated English Translation of Specification and Claims and Patent Abstracts of Japan of 2004-82709 dated Mar. 18, 2004.
Computer-Generated English Translation of Specification and Claims and Patent Abstracts of Japan of 2002-356637 dated Dec. 13, 2002.
Computer-Generated English Translation of Specification and Claims and Patent Abstracts of Japan of 2002-294134 dated Oct. 9, 2002.
Computer-Generated English Translation of Specification and Claims and Patent Abstracts of Japan of 2001-123098 dated May 8, 2001.
Computer-Generated English Translation of Specification and Claims and Patent Abstracts of Japan of 2001-98195 dated Apr. 10, 2001.
Computer-Generated English Translation of Specification and Claims and Patent Abstracts of Japan of 11-209671 dated Aug. 3, 1999.
Computer-Generated English Translation of Specification and Claims and Patent Abstracts of Japan of 8-337748 dated Dec. 24, 1996.

* cited by examiner

*Primary Examiner* — Basia Ridley
*Assistant Examiner* — Alexander C Kollias
(74) *Attorney, Agent, or Firm* — Ladas & Parry LLP

(57) ABSTRACT

An ink set includes: at least one black ink composition that contains at least a self-dispersing pigment and a resin emulsion; and at least one color ink composition that contains at least an organic pigment covered with water-insoluble polymer and a resin emulsion.

10 Claims, No Drawings

INK SET, AND RECORDING METHOD AND RECORDED MATERIAL USING THE SAME

CROSS-REFERENCES TO RELATED APPLICATIONS

The entire disclosure of Japanese Patent Application No. 2005-235408, filed on Aug. 15, 2005, is expressly incorporated herein by reference.

BACKGROUND

1. Technical Field

The present invention relates to an ink set. More specifically, the invention relates to an ink set suited for use in an inkjet recording system.

2. Related Art

Inkjet recording methods are printing methods in which printing is performed by making small ink droplets jet and adhere to a recording medium such as paper. Owing to the recent drastic developments in inkjet recording techniques, the inkjet recording methods are now used also for highly precise image recording (printing), which has until now been performed with photography or offset printing. Therefore, high quality recording is required not only for generally used plain paper and dedicated inkjet recoding paper (matte and gloss), but also for recording media such as printing paper.

An ink composition containing water, color material as colorant, water-soluble organic solvent, and surfactant, etc., is generally known as the ink used in the inkjet recording. Dye or pigment is used as the colorant. Particularly in a color ink, water-soluble dyes are often used because of their high color saturation, clarity, and water solubility, etc. However, lighffastness or gas fastness is generally insufficient in those dyes. The waterfastness of those dyes is also insufficient because of their water solubility, and therefore, matter recorded with an ink using water soluble dye has poor recorded image storage stability.

Meanwhile, water insoluble colorant has better waterfastness. Among water insoluble colorants, pigment is the color material having particularly excellent lighffastness, gas fastness, and waterfastness. Therefore, pigment inks utilizing those color material properties have been developed. For example, a water-based pigment ink in which pigment is dispersed with surfactant or polymer dispersant, one using self-dispersing pigment obtained by adding a water dispersible functional group to the pigment surface, and one using coloring particles obtained by covering pigment with water dispersible resin, have been proposed.

Some of those pigment inks have pigment particles (including pigment-containing coloring particulates) that are stably dispersed in an ink solution. However, during the process of the ink being dried after being attached to a recording medium such as paper, a structure in the ink changes with evaporation of water or volatile solvent. Therefore, a stable dispersion structure changes and the pigment is likely to aggregate. If that pigment is deposited on the recording medium, such as paper, that results in a problem of being unable to obtain high-quality images, because of the unsmoothed surface, reduced glossiness and less uniform printed images. Furthermore, there is another problem in that light reflected from the deposited pigment makes the printed images give off a hue different from the inherent one (bronzing), and images with a desired and uniform hue cannot be obtained.

The above-described (undesirable) hue change as a result of deposited color material sometimes occurs when using dye too, if it is used in high concentration. In order to prevent this, a method has been proposed where a water soluble polymer having a branched chain is applied to an ink to prevent dye molecules from crystallizing or aggregating during the drying of the ink, thereby reducing hue change (see JP-A-8-337748).

Also, various proposals have been made with respect to the quality of images made using a pigment ink. For example, limiting the particle diameter of a pigment dispersed in an ink (see JP-A-2002-356637), and containing a pigment together with a pigment derivative (see JP-A-2002-294134) have been proposed in order to improve glossiness, dispersiblity, etc.; containing polymer particulates (see JP-A-2001-123098) and containing inorganic particulates (see JP-A-11-209671) have been proposed in order to decrease blur and improve coloring ability; and an ink containing a pigment dispersion containing a water insoluble vinyl polymer has been proposed in order to improve printing density when applied to plain paper, and also improve glossiness when applied to inkjet-only paper (see JP-A-2005-041994).

However, the method disclosed in JP-A-8-337748, although it is effective in preventing the depositing of a color material included in a dye ink, cannot bring about sufficient advantages for a pigment ink. Furthermore, the method has had problems in terms of reliability, for example, a water soluble polymer is contained, and that decreases dispersion stability or increases ink viscosity.

In addition, there have also been unsolved problems when combining several known types of pigment ink to make an ink set and forming an image using that ink set. For example, even though each ink can exhibit good printing quality if it is used alone, if different color inks are mixed, pigments can aggregate in that color-mixed portion, reducing glossiness and making the printed images less uniform. The problem of gloss change also remains unsolved. Gloss change means a phenomenon where, if one touches a recorded material with one's finger or something, although the pigment is not removed, (finger) marks are left on the material; the colors at the touched portion seem different; or the gloss at the touched portion changes.

SUMMARY

The invention has been made in consideration of the above-described problems, and an advantage of some aspects of the invention is the provision of a pigment ink set suited for use in an inkjet recording system, the ink set being capable of exhibiting good coloring ability, glossiness and rubbing resistance when it is applied to various types of recording media (such as plain paper, matte paper, glossy paper and printing paper), and the ink set itself being very reliable, e.g., having good preservability and being less prone to clogging.

According to a first aspect of the invention, provided is an ink set including: at least one black ink composition that contains at least a self-dispersing pigment and a resin emulsion; and at least one color ink composition that contains at least an organic pigment covered with water-insoluble polymer and a resin emulsion.

In the above ink set, the self-dispersing pigment and the organic pigment preferably have a volume mean particle size of from 50 nm to 250 nm.

In the above ink set, the resin emulsion contained in the black ink composition is preferably formed from a mixture of resin particulates that form a film-like structure at a temperature of 40° C. or lower and resin particulates that do not form a film-like structure at a temperature of 40° C. or lower.

In the above ink set, the resin emulsion contained in the black ink composition preferably has a volume mean particle size of from 20 nm to 200 nm.

In the above ink set, the weight ratio of the organic pigment to the water insoluble polymer contained in the color ink composition is preferably within the range of 1:0.2 to 1:1.

In the above ink set, the resin emulsion contained in the color ink composition is preferably formed from a water insoluble polymer with a weight-average molecular weight of from 75000 to 600000.

In the above ink set, the resin emulsion contained in the color ink composition preferably has a volume mean particle size of from 20 nm to 200 nm.

The above ink set preferably has at least three of the color ink compositions, including a yellow ink composition, a magenta ink composition and a cyan ink composition.

Preferably, the self-dispersing pigment contained in the black ink composition is made from a carbon black pigment; the organic pigment contained in the yellow ink composition includes at least one selected from among C. I. Pigment Yellows 74, 109, 110, 128, 138, 147, 150, 155, 180 and 188; the organic pigment contained in the magenta ink composition includes at least one selected from among C. I. Pigment Reds 122, 202, 207 and 209, and C. I. Pigment Violet 19; and the organic pigment contained in the cyan ink composition includes at least one selected from among C. I. Pigment Blues 15, 15:1, 15:2, 15:3, 15:4 and 16.

Preferably, the resin emulsion contained in the yellow ink composition has a volume mean particle size of from 20 nm to 80 nm, and the resin emulsions contained in the magenta ink composition and the cyan ink composition both have a volume mean particle size of from 50 nm to 200 nm.

Preferably, the resin emulsion contained in the yellow ink composition is formed from a water insoluble polymer that does not form a film-like structure at a temperature of 40° C. or lower, and the resin emulsions included in the cyan ink composition and the magenta ink composition are both formed from a water insoluble polymer that forms a film-like structure at a temperature of 40° C. or lower.

Preferably, the resin emulsion contained in the yellow ink composition is formed from a polymer prepared by polymerization involving emulsion polymerization.

Preferably, the resin emulsion contained in the magenta ink composition is formed from a polymer prepared by polymerization involving phase-inversion emulsification.

Preferably, the resin emulsion contained in the cyan ink composition is formed from a polymer prepared by polymerization involving phase-inversion emulsification.

In the above ink set, preferably, each of the ink compositions further contains at least water, a water soluble organic compound, a pH regulator, and a nonionic surfactant.

More preferably, the water soluble organic compound includes at least a polyhydric alcohol, a solid humectant, and a butyl ether of a glycol ether.

Preferably, the pH regulator is an alkali hydroxide and/or a trialkanolamine.

Preferably, the nonionic surfactant is an acetylene glycol based surfactant and/or a polyether-modified siloxane based surfactant.

According to another aspect of the invention, provided is a recording method for performing recordation via an inkjet recording system and using an ink set as described above.

According to still another aspect of the invention, provided is a recorded material made using an ink set as described above.

DESCRIPTION OF EXEMPLARY EMBODIMENTS

A preferred embodiment of the ink set according to the invention is explained below. As described above, an ink set according to the invention includes: at least one black ink composition that contains at least a self-dispersing pigment and a resin emulsion; and at least one color ink composition that contains at least an organic pigment covered with water-insoluble polymer and a resin emulsion.

Black Ink Composition

The pigment used in the black ink composition preferably is carbon black. Examples of the carbon black include: #2300, #900, HCF88, #33, #40, #45, #52, MA7, MA8, MA100, #2200B, and so on, manufactured by Mitsubishi Chemical Corporation; RAVEN 5750, RAVEN 5250, RAVEN 5000, RAVEN 3500, RAVEN 1255, and RAVEN 700 manufactured by Columbian Chemicals Company; REGAL 400R, REGAL 330R, REGAL 660R, MOGUL L, MOGUL 700, MONARCH 800, MONARCH 880, MONARCH 900, MONARCH 1000, MONARCH 1100, MONARCH 1300, and MONARCH 1400 manufactured by Cabot Corporation; and Color COLOR BLACK FW1, COLOR BLACK FW2V, COLOR BLACK FW18, COLOR BLACK FW 200, COLOR BLACK S150, COLOR BLACK S160, COLOR BLACK S170, PRINTEX 35, PRINTEX U, PRINTEX V, PRINTEX 140U, SPECIAL BLACK 6, SPECIAL BLACK 5, SPECIAL BLACK 4A, SPECIAL BLACK 4, and so on, manufactured by Degussa Corporation. Each can either be used alone, or a combination of them can be used together.

The "self-dispersing pigment" is a pigment obtained by bonding the pigment surface with a number of hydrophilic function groups and/or salts thereof (hereinafter referred to as "dispersibility-imparting groups") directly, or indirectly via an alkyl group, alkyl ether group, or aryl group, etc., and can be dispersed/dissolved in an aqueous vehicle without dispersant. "[Being] dispersed/dissolved in an aqueous vehicle without dispersant" means the state where pigment particles of the smallest diameter capable of being dispersed in an aqueous vehicle without dispersant for dispersing the pigment stably exist. The "pigment particles of the smallest diameter capable of being dispersed" indicate a pigment particle diameter that cannot be made any smaller even if the dispersal time is extended.

The ink containing the self-dispersing pigment as colorant does not need to contain the dispersant mentioned above, which is usually contained for the purpose of dispersing pigment, and in an ink with no dispersant, foam formation caused by dispersant hardly occurs, and an ink with good discharge stability can be easily manufactured. Moreover, because a drastic increase in viscosity caused by dispersant can be prevented, an ink can contain a greater amount of pigment. Accordingly, printing density can be sufficiently raised, and so the ink's handling becomes easier.

The self-dispersing pigment is manufactured by bonding (grafting) the pigment surface with a dispersibility-imparting group, such as —COOH, —CO, —OH, —SO$_3$H, —PO$_3$H$_2$ or quaternary ammonium or salts thereof, or a substituent having that dispersibility-imparting group, by performing physical or chemical treatment on the pigment. Examples of physical treatment include vacuum plasma treatment. Examples of chemical treatment include wet oxidation treatment, in which the pigment surface is oxidized with oxidant in water, and treatment in which a pigment surface is bonded with a carboxyl group via a phenyl group by bonding the pigment surface with p-aminobenzoic acid.

In the present embodiment, self-dispersing pigment subjected to surface treatment based on oxidization treatment with hypohalous acid and/or hypohalous acid salt or oxidization treatment with ozone is preferably used, in terms of high coloration.

The self-dispersing pigment may also be a commercial one. Examples include MICROJET CW-1 (product name; manufactured by Orient Chemical Industries, Ltd.), CAB-O-JET200, CAB-O-JET300 (product names; manufactured by Cabot Corporation), and similar.

The content of the self-dispersing pigment in the black ink composition used for this embodiment is preferably within the range of 2-15 weight %. If the content is less than 2 weight %, the printing density (OD value) is insufficient in some cases. Meanwhile, if the content is more than 15 weight %, nozzle clogging or discharge instability may occur, decreasing the ink reliability.

From the viewpoint of dispersion stability in the black ink composition, acquisition of higher OD value in the recorded images and further increase in glossiness, the self-dispersing pigment preferably has 50-250 nm volume mean particle size. That volume mean particle size can be measured using a MICROTRAC UPA150 (manufactured by Microtrac Inc.) or a LPA3100 particle size distribution measure (manufactured by Otsuka Electronics Co., Ltd.).

In order to achieve good fixability and improved coloring ability (density), the black ink composition contains a resin emulsion. The resin emulsion preferably contains two or more types of resin particulates, and a preferable example of that resin emulsion containing two or more types of resin particulates is an emulsion of a mixture of resin particulates that form a film-like structure at a temperature of 40° C. or lower and resin particulates that do not form a film-like structure at 40° C. or lower. By mixing resin particulates that form a film-like structure at 40° C. or lower and resin particulates that do not to make a resin emulsion, the resin particulates that form a film-like structure at 40° C. or lower improve fixability and rubbing resistance, while the resin particulates that do not form a film-like structure at 40° C. or lower, because they don't form a film-like structure at an ambient temperature, remain on paper as particles, increasing the pigment particles existing on the surface of paper, thereby realizing well developed color on plain paper and recycled paper.

The above resin emulsion is preferably formed from one or more types of resins selected from the group consisting of acrylic resins, methacrylic resins, vinyl acetate type resins, vinyl chloride type resins, and styrene-acryl type resins. These resins may be used as either homopolymers or copolymers. Resins of either single or multiple structure (core-shell type, etc.) may be used.

Furthermore, in the above resin emulsion containing two or more types of resins used for the black ink composition, at least one resin is preferably added to the black ink composition in the form of an emulsion of resin particulates obtained via emulsion polymerization of unsaturated monomers. This is because resin particulates added to a black ink composition as they are may not be able to be dispersed sufficiently, and so an emulsion is suitable when manufacturing a black ink composition. In addition, an emulsion is preferably an acrylic emulsion, from the viewpoint of preservability of the ink composition.

An emulsion of resin particulates (such as an acrylic emulsion) can be obtained using a known emulsion polymerization method. For example, one can be obtained by using unsaturated monomers (such as unsaturated vinyl monomers) as a polymerization initiator and subjecting these monomers to emulsion polymerization in water in the presence of a surfactant.

Examples of unsaturated monomers include: those normally used in emulsion polymerization, such as acrylic acid ester monomers, methacrylic acid ester monomers, aromatic vinyl monomers, vinyl ester monomers, vinyl cyan compound monomers, halide monomers, olefin monomers and diene monomers. More specific examples of the unsaturated monomers include: acrylic acid esters such as methyl acrylate, ethyl acrylate, isopropyl acrylate, n-butyl acrylate, isobutyl acrylate, n-amyl acrylate, isoamyl acrylate, n-hexyl acrylate, 2-ethylhexyl acrylate, octyl acrylate, decyl acrylate, dodecyl acrylate, octadecyl acrylate, cyclohexyl acrylate, phenyl acrylate, benzyl acrylate, and glycidyl acrylate; methacrylic acid esters such as methyl methacrylate, ethyl methacrylate, isopropyl methacrylate, n-butyl methacrylate, isobutyl methacrelate, n-amyl methacrylate, isoamyl methacrylate, n-hexyl methacrylate, 2-ethylhexyl methacrylate, octyl methacrylate, decyl methacrylate, dodecyl methacrylate, octadecyl methacrylate, cyclohexyl methacrylate, phenyl methacrylate, benzyl methacrylate, glycidyl methacrylate, polyethylene glycol monomethacrylate, polypropylene glycol monometacrylate, and ethylene glycol propylene glycol monometachrylate; vinyl esters such as vinyl acetate; vinyl cyan compounds such as acylonitrile and methacrylonitrile; halogenoid monomers such as vinylidene chloride and vinyl chloride; aromatic vinyl monomers such as styrene, α-methylstyrene, vinyl toluene, 4-t-butylstyrene, chlorstyrene, vinylanisole, and vinyl naphthalene; olefins such as ethylene and propylene; dienes such as butadiene and chloroprene; vinyl monomers such as vinyl ether, vinyl ketone, and vinyl pyrrolidone; unsaturated carboxylic acids such as acrylic acid, methacrylic acid, itaconic acid, fumaric acid, maleic acid, and stylene carboxylic acid; acrylamides such as acrylamide, methacrylamide, and N,N'-dimethylacrylamide; hydroxyl-containing monomers such as 2-hydroxyethyl acrylate, 2-hydroxypropyl acrylate, 2-hydroxyethyl methacrylate, and 2-hydroxypropyl methacrylate; styrene macromonomer; and silicone macromonomer, etc. The unsaturated monomers can either be used alone, or a combination of two or more can be used together.

It is also possible to use cross-linkable monomers having two or more polymerizable double bonds, examples of which include: diacrylate compounds such as polyethylene glycol diacrylate, triethylene glycol diacrylate, 1,3-butylene glycol diacrylate, 1,4-butylene glycol diacrylate, 1,6-hexanediol diacrylate, neopentyl glycol diacrylate, 1,9-nonanediol diacrylate, polypropylene glycol diacrylate, 2,2'-bis(4-acryloxypropyloxyphenyl)propane, and 2,2'-bis(4-acryloxydiethoxyphenyl)propane; triacrylate compounds such as trimethylolpropane triacrylate, trimethylolethane triacrylate, and tetramethylolmethane triacrylate; tetraacrylate compounds such as ditrimethylol tetraacrylate, tetramethylolmethane tetraacrylate, and pentaerythritol tetraacrylate; hexaacrylate compounds e.g., dipentaerythritol hexaacrylate; dimethacrylate compounds such as ethylene glycol dimethacrylate, diethylene glycol dimethacrylate, triethylene glycol dimethacrylate, polyethylene glycol dimethacrylate, 1,3-butylene glycol dimethacrylate, 1,4-butylene glycol dimethacrylate, 1,6-hexanediol dimethacrylate, neopentyl glycol dimethacrylate, dipropylene glycol dimethacrylate, polypropylene glycol dimethacrylate, polybutylene glycol dimethacrylate, and 2,2'-bis(4-methacryloxydiethoxyphenyl)propane; trimethacrylate compounds such as trimethylolpropane trimethacrylate and trimethylolethane trimethacrylate; methylenebisacrylamide; and divinylbenzene. These may be used alone or in a combination of two or more types.

Moreover, in addition to the polymerization initiator and surfactant used in the emulsion polymerization, a chain-transfer agent as well as a neutralizing agent or others may be used in the usual manner. In particular, ammonia, and a hydroxide of an inorganic alkali, such as sodium hydroxide and potassium hydroxide, are preferably used as the neutralizing agent.

In this embodiment, from the viewpoint of efficient acquisition of appropriate inkjet property values, reliability (in terms of nozzle clogging and discharge stability, etc.), the advantages of the invention (a high OD value, fixability, and glossiness), the resin emulsion content in the black ink composition is preferably in the range of 1-10 weight %.

Meanwhile, the resin emulsion used in the black ink composition preferably has a volume mean particle size within the range of 20 to 200 nm, so that improved dispersion stability can be obtained in the ink composition and also so that a recorded image with a higher OD value and much better glossiness can be obtained.

Color Ink Composition

From the point of view of waterfastness, weather fastness, and pigment dispersal stability, etc, an organic pigment covered with water-insoluble polymer is used as a colorant for the color ink composition used in this embodiment.

The water insoluble polymer is a polymer obtained by polymerizing, by solution polymerization, at least a polymerizable unsaturated monomer and polymerization initiator. The water insoluble polymer is a polymer with 1 g or less solubility in 100 g water at 25° C. after neutralization.

Examples of the polymerizbale unsaturated monomers include: vinyl aromatic hydrocarbon, methacrylic acid esters, methacrylamide, alkyl substituted methacrylamide, maleic anhydride, vinyl cyan compounds, methyl vinyl ketone, and vinyl acetate. More specific examples include: styrene, α-methylstyrene, vinyl toluene, 4t-butylsyrene, chlorstyrene, vinyl anisole, vinyl naphthalene, methyl methacrylate, ethyl methacrylate, isopropyl methacrylate, n-butyl methacrylate, isobutyl methacrylate, n-amyl methacrylate, isoamyl methacrylate, n-hexyl methacrylate, 2-ethylhexyl methacrylate, octyl methacrylate, decyl methacrylate, dodecyl methacrylate, octadecyl methacrylate, cyclohexyl methacrylate, phenyl methacrylate, benzyl methacrylate, glycidyl methacrylate, acrylonitrile, and methacrylonitrile, etc. These may either be used alone, or a combination of two or more types can be used together.

The water insoluble polymer, which imparts glossiness to a printed image, preferably includes monomers each having a hydrophilic group and salt formation group.

Examples of the monomers having a hydrophilic group include: polyethylene glycol monometacrylate, polypropylene glycol monometacrylate, and ethylene glycol propylene glycol monometacrylate, etc. They may either be used alone, or a combination of two or more types can be used together. In particular, glossiness in a printed image can be further improved by using a monomer component that forms a polymer having a branched chain, such as polyethylene glycol (2-30) monometacrylate, polyethylene glycol (1-15) propylene glycol (1-15) monometacrylate, polypropylene glycol (2-30) methacrylate, methoxypolyethylene glycol (2-30) methacrylate, methoxypolytetramethylene glycol (2-30) methacrylate, and methoxy (ethylene glycol.propylene glycol copolymer) (1-30) methacrylate, etc.

Examples of monomers having a salt formation group include: acrylic acid, methacrylic acid, styrene carboxylic acid, and maleic acid, etc. These may either be used alone, or a combination of two or more types can be used together.

Macromonomers having a polymerizable functional group at one terminal, such as styrene type macromonomers or silicone type macromomoners, or other types of monomers can also be included.

When polymerization is performed, a known radical polymerization agent or polymerization chain transfer agent may also be added. The organic pigment covered with water-insoluble polymer is obtained with a phase-inversion emulsification method. In other words, the water insoluble polymer is dissolved into an organic solvent, such as methanol, ethanol, isopropanol, n-butanol, acetone, methylethyl ketone, or dibutyl ether, etc; organic pigment is added to the above obtained solution; an oil-in-water-type dispersion is prepared by adding a neutralization agent and water to the above obtained solution, mixing it, and performing dispersion treatment thereon; and the organic pigment covered with water-insoluble polymer can be obtained as a water-based dispersion by removing the organic solvent from the above obtained dispersion. The mixing and dispersion treatment can be performed by using, for example, a ball mill, roll mill, bead mill, high-pressure homogenizer, or high-speed stirring disperser, etc.

The neutralization agent preferably is a tertiary amine such as ethylamine or trimethylamine, lithium hydroxide, potassium hydroxide, or ammonia, etc. The acquired water-based dispersion preferably has a pH of 6-10.

From the point of view of stable dispersion of colorant, particularly pigment, the water insoluble polymer that covers the pigment preferably has a weight-average molecular weight of from 10000 to 150000. The weight-average molecular weight can be measured with a molecular weight analysis method using gel permeation chromatography (GPC).

In terms of coloring ability and glossiness on a glossy medium, the mean particle size in the ink composition is preferably within the range of 50-250 nm, more preferably 50-150 nm. The mean particle size can be measured using a MICROTRAC UPA150 (manufactured by Microtrac Inc.) or an LPA 3100 particle size distribution measure (manufactured by Otsuka Electronics Co., Ltd.).

The color ink composition(s) used in the present embodiment are preferably, at the least, a yellow ink composition, magenta ink composition, and cyan ink composition. Examples of the pigments in the color ink compositions include pigment yellow, pigment red, pigment violet, and pigment blue, etc., listed in the color index. More specifically, C.I. Pigment Yellow 1, 3, 12, 13, 14, 17, 24, 34, 35, 37, 42, 53, 55, 74, 81, 83, 95, 97, 98, 100, 101, 104, 108, 109, 110, 117, 120, 128, 138, 147, 150, 153, 155, 174, 180, 188, 198; C.I. Pigment Red 1, 3, 5, 8, 9, 16, 17, 19, 22, 38, 57:1, 90, 112, 122, 123, 127, 146, 184, 202, 207, 209; C.I. Pigment Violet 1, 3, 5:1, 16, 19, 23, 38; C.I. Pigment Blue 1, 2, 15, 15:1, 15:2, 15:3, 15:4, 16; and C.I. Pigment Black 1, and 7, etc. are used. A plurality of pigments from among them may be used to form the ink composition.

In particular, the organic pigment contained in the yellow ink composition preferably includes at least one selected from C.I. Pigment Yellow 74, 109, 110, 128, 138, 147, 150, 155, 180, and 188. The organic pigment contained in the magenta ink composition preferably includes at least one selected from C.I. Pigment Red 122, 202, 207, and 209 and C.I. Pigment Violet 19. The organic pigment contained in the cyan ink composition preferably includes at least one selected from C.I. Pigment Blue 15, 15:1, 15:2, 15:3, 15:4, and 16.

Alternatively, any water insoluble pigment, including those not listed in the color index, may be used.

The content of the above-explained organic pigment covered with water-insoluble polymer in the color ink compositions is preferably within the range of 0.5-8.0 weight %. If the content is less than 0.5 weight %, the printing density (coloring ability) is insufficient in some cases. Meanwhile, if the content exceeds 8.0 weight %, glossiness reduction on a glossy medium, nozzle clogging, or discharge instability may occur, decreasing the ink reliability.

From the point of view of dispersion stability, ink preservability and prevention of nozzle clogging, and glossiness on a glossy medium, the ratio of the organic pigment to the water insoluble polymer is preferably between 1:0.2 to 1:1. If the ratio of the water insoluble polymer to the organic pigment is less than 20%, the pigment cannot be stably dispersed and the organic pigment aggregates. Meanwhile, if the ratio of the water insoluble polymer to the organic pigment exceeds 100%, bronzing is reduced, but coloring ability decreases and the glossiness on a glossy medium deteriorates.

Also, from the viewpoint of coloring ability and the glossiness on a glossy medium, the volume mean particle size of the pigment particles in the color ink compositions is preferably within the range of 50 to 250 nm. That volume mean particle size can be measured using a MICROTRAC UPA150 (manufactured by Microtrac Inc.) or a LPA3100 particle size distribution measure (manufactured by Otsuka Electronics Co., Ltd.).

The organic pigment covered with water-insoluble polymer may be not completely covered with the water insoluble polymers, partially exposing the colorant.

For achieving good fixability and uniform gloss, the color ink compositions contain a resin emulsion.

In this embodiment, by containing a resin emulsion formed from a water insoluble polymer having a weight-average molecular weight of 75000 to 600000, the color ink compositions can be ink compositions with good fixability and reliability. This is because a weight-average molecular weight less than 75000 results in insufficient fixability, and a weight-average molecular weight exceeding 600000 causes problems in terms of reliability, such as unstable discharge.

The above-mentioned water insoluble polymer is obtained by co-polymerizing monomers using a known method such as bulk polymerization, solution polymerization, suspension polymerization and emulsion polymerization, and by subjecting the so obtained polymer to phase-change emulsification in water or emulsion polymerization in water, a resin emulsion is obtained.

Generally, if a colorant dispersion containing a polymer as a dispersing agent is applied [to an ink] together with a polymer as an additive, adsorption/desorption to/from the colorant occurs in the dispersing agent polymer and the additive polymer, which causes the problems of lost dispersion stability and deteriorated ink preservability. However, in the pigment dispersion contained in the color ink compositions used in this embodiment, it is assumed that, because the pigment is covered with a water insoluble polymer and stably exists as dispersed particles, adsorption/desorption [to/from the pigment] is less likely to occur in the water insoluble polymer and the resin emulsion and thus the dispersion stability can be preserved. In particular, a resin having an internal crosslink structure is preferably used because that resin itself has high stability. Also, a resin having a similar structure to that of the water insoluble polymer covering the pigment is particularly preferable because, if it is applied to an ink composition together with the water insoluble polymer, stable dispersion can be maintained even if adsorption/desorption [to/from the pigment] occurs in the water insoluble polymer and the resin emulsion. Note that, in this specification, "having a similar structure" means being composed of the same constituents as those of the water insoluble polymer covering the colorant.

Moreover, for improving dispersion stability in the ink composition, achieving a recorded image with improved glossiness, and reducing bronzing, the volume mean particle size of the resin emulsion is preferably within the range of 20 to 200 nm. That volume mean particle size can be measured using a MICROTRAC UPA150 (manufactured by Microtrac Inc.) or a LPA3100 particle size distribution measure (manufactured by Otsuka Electronics Co., Ltd.).

Particularly for the yellow ink composition, in order to improve rubbing resistance without reducing the dispersion stability in the ink composition and the glossiness of a recorded image, the resin emulsion preferably has a volume mean particle size of 20 to 80 nm, and is formed from a water insoluble polymer that does not form a film-like structure at a temperature of 40° C. or lower. Adding a water insoluble polymer that does not form a film-like structure at a temperature of 40° C. or lower is aimed, not at an improvement of fixability and rubbing resistance by a film-like resin, but at keeping the polymer on the surface of a recording medium as particulates so that the medium surface becomes more smooth, thereby preventing any gloss change or removal of a colorant if the surface is rubbed. Using a water insoluble polymer that does not form a film-like structure at a temperature of 40° C. or lower, the ink composition has an advantageous effect of considerably higher reliability in terms of clogging recoverability, etc., than an ink composition using a polymer that does form a film-like structure.

The above water insoluble polymer that does not form a film-like structure at a temperature of 40° C. or lower is preferably one or more types selected from the group consisting of acrylic polymers, methacrylic polymers, styrene type polymers, urethane type polymers, acrylamide type polymers and epoxy type polymers. These types of polymer may be used as either homopolymers or copolymers. Also, polymers of either single or multiple structure (core-shell type, etc.) may be used, and a polymer having a crosslink created using a cross-linking agent is preferably used.

With respect to the above water insoluble polymer preferably used for the yellow ink composition, it is applied to the ink composition preferably in the form of an emulsion of resin particles that is obtained via the emulsion polymerization of unsaturated monomers. This is because the resin particles applied to the ink composition as they are may not be able to be dispersed sufficiently, and an emulsion is preferred when manufacturing the ink.

An emulsion of resin particles can be obtained using a known emulsion polymerization method. For example, one can be obtained by using unsaturated monomers (such as unsaturated vinyl monomers) as a polymerization initiator and subjecting these monomers to emulsion polymerization in water in the presence of a surfactant.

Examples of unsaturated monomers include: those normally used in emulsion polymerization, such as acrylic acid ester monomers, methacrylic acid ester monomers, aromatic vinyl monomers, vinyl ester monomers, vinyl cyan compound monomers, halide monomers, olefin monomers and diene monomers. More specific examples of the unsaturated monomers include: acrylic acid esters such as methyl acrylate, ethyl acrylate, isopropyl acrylate, n-butyl acrylate, isobutyl acrylate, n-amyl acrylate, isoamyl acrylate, n-hexyl acrylate, 2-ethylhexyl acrylate, octyl acrylate, decyl acrylate, dodecyl acrylate, octadecyl acrylate, cyclohexyl acrylate, phenyl acrylate, benzyl acrylate, and glycidyl acrylate; methacrylic acid esters such as methyl methacrylate, ethyl methacrylate, isopropyl methacrylate, n-butyl methacrylate, isobutyl methacrelate, n-amyl methacrylate, isoamyl methacrylate, n-hexyl methacrylate, 2-ethylhexyl methacrylate, octyl methacrylate, decyl methacrylate, dodecyl methacrylate, octadecyl methacrylate, cyclohexyl methacrylate, phenyl methacrylate, benzyl methacrylate, glycidyl methacrylate, polyethylene glycol monomethacrylate, polypropylene glycol monometacrylate, and ethylene glycol propylene glycol monometachrylate; vinyl esters such as vinyl acetate; vinyl cyan compounds such as acylonitrile and methacrylonitrile; halogenoid monomers such as vinylidene chloride and vinyl chloride; aromatic vinyl monomers such as styrene, α-methylstyrene, vinyl toluene, 4-t-butylstyrene, chlorstyrene, vinylanisole, and vinyl naphthalene; olefins such as ethylene and propylene; dienes such as butadiene and chloroprene; vinyl monomers such as vinyl ether, vinyl ketone, and vinyl pyrrolidone; unsaturated carboxylic acids such as acrylic acid, methacrylic acid, itaconic acid, fumaric acid, maleic acid, and stylene carboxylic acid; acrylamides such as acrylamide, methacrylamide, and N,N'-dimethylacrylamide; hydroxyl-containing monomers such as 2-hydroxyethyl acrylate, 2-hydroxypropyl acrylate, 2-hydroxyethyl methacrylate, and 2-hydroxypropyl methacrylate; styrene macromonomer; and silicone macromonomer, etc. The unsaturated monomers can either be used alone, or a combination of two or more can be used together.

Also, as a cross-linking agent, cross-linkable monomers having two or more polymerizable double bonds can be used, examples of which include: diacrylate compounds such as polyethylene glycol diacrylate, triethylene glycol diacrylate, 1,3-butylene glycol diacrylate, 1,4-butylene glycol diacrylate, 1,6-hexanediol diacrylate, neopentyl glycol diacrylate, 1,9-nonanediol diacrylate, polypropylene glycol diacrylate, 2,2'-bis(4-acryloxypropyloxyphenyl)propane, and 2,2'-bis(4-acryloxydiethoxyphenyl)propane; triacrylate compounds such as trimethylolpropane triacrylate, trimethylolethane triacrylate, and tetramethylolmethane triacrylate; tetraacrylate compounds such as ditrimethylol tetraacrylate, tetramethylolmethane tetraacrylate, and pentaerythritol tetraacrylate; hexaacrylate compounds e.g., dipentaerythritol hexaacrylate; dimethacrylate compounds such as ethylene glycol dimethacrylate, diethylene glycol dimethacrylate, triethylene glycol dimethacrylate, polyethylene glycol dimethacrylate, 1,3-butylene glycol dimethacrylate, 1,4-butylene glycol dimethacrylate, 1,6-hexanediol dimethacrylate, neopentyl glycol dimethacrylate, dipropylene glycol dimethacrylate, polypropylene glycol dimethacrylate, polybutylene glycol dimethacrylate, and 2,2'-bis(4-methacryloxydiethoxyphenyl)propane; trimethacrylate compounds such as trimethylolpropane trimethacrylate and trimethylolethane trimethacrylate; methylenebisacrylamide; and divinylbenzene. These may be used alone or in a combination of two or more types.

Moreover, in addition to the polymerization initiator and surfactant used in the emulsion polymerization, a chain-transfer agent as well as a neutralization agent or others may be used in the usual manner. In particular, ammonia, and a hydroxide of an inorganic alkali, such as sodium hydroxide and potassium hydroxide, are preferably used as the neutralization agent.

Meanwhile, the magenta ink composition and the cyan ink composition preferably contains a resin emulsion prepared via phase-change emulsification, which is a method enabling stable emulsification of a water insoluble polymer with much higher hydrophilicity, in order to obtain dispersion stability in the ink composition and also to achieve a recorded image with good glossiness and fixability. For improving dispersion stability, achieving a recorded image with improved glossiness, and reducing bronzing, the volume mean particle size of the above resin emulsion is preferably 50-200 nm.

The resin emulsion preferably used for the magenta ink composition and cyan ink composition is formed from a block copolymer resin that is composed of monomers each having a hydrophobic group and monomers each having a hydrophilic group and contains at least a monomer having a salt formation group. In particular, a resin having a similar structure to that of the water insoluble polymer covering the pigment is preferable because, if that resin is applied to the ink composition together with the water insoluble polymer, it enables stable dispersion even if adsorption/desorption [to/from the pigment] occurs in the water insoluble polymer and the resin emulsion. Here, having a similar structure means being composed of the same constituents as those of the water insoluble polymer covering the colorant.

Examples of the monomers having a hydrophobic group include: methacrylic acid esters such as methyl methacrylate, ethyl methacrylate, isopropyl methacrylate, n-butyl methacrylate, isobutyl methacrylate, n-amyl methacrylate, isoamyl methacrylate, n-hexyl methacrylate, 2-ethylhexyl methacrylate, octyl methacrylate, decyl methacrylate, dodecyl methacrylate, octadecyl methacrylate, cyclohexyl methacrylate, phenyl methacrylate, benzyl methacrylate and glycidyl methacrylate; vinyl esters e.g., vinyl acetate; vinyl cyan compounds such as acrylonitrile and methacrylonitrile; and aromatic vinyl monomers such as styrene, α-methylstyrene, vinyltoluene, 4-t-butylstyrene, chlorostyrene, vinylanisole, and vinylnaphthalene, and these may either be used alone, or a combination of two or more types can be used together.

Examples of the monomers having a hydrophilic group include polyethylene glycol monomethacrylate, polypropylene glycol monomethacrylate, and ethylene glycol.propylene glycol monomethacrylate, etc. These may either be used alone, or a combination of two or more types can be used together. In particular, by using a monomer component that forms a polymer having a branched chain, such as polyethylene glycol (2-30) monomethacrylate, polyethylene glycol (1-15) propylene glycol (1-15) monomethacrylate, polypropylene glycol (2-30) methacrylate, methoxypolyethylene glycol (2-30) methacrylate, methoxypolytetramethylene glycol (2-30) methacrylate, and methoxy(ethylene glycol.propylene glycol copolymer) (1-30) methacrylate, the glossiness in a printed image ca be further improved.

Examples of the monomer with a salt formation group include acrylic acid, methacrylic acid, styrene carboxylic acid and maleic acid, etc. These may either be used alone, or a combination of two or more types can be used together.

In addition, macromonomers having a polymerizable functional group at one terminal, such as styrene type macromonomers and silicone type macromonomers, or other types of monomer can also be included.

The water insoluble polymer used for the color ink compositions is obtained by co-polymerizing monomers using a known method such as bulk polymerization, solution polymerization, suspension polymerization and emulsion polymerization, and solution polymerization is particularly preferable. During polymerization, a known radical polymerization agent or polymerization chain-transfer agent may be added.

A resin emulsion is prepared by dissolving a resin obtained via polymerization in an organic solvent; adding a neutralization agent and water and performing a dispersion treatment; and then removing the organic solvent from the obtained dispersion.

The neutralization agent is preferably a tertiary amine such as ethylamine or trimethylamine, or lithium hydroxide, sodium hydroxide, potassium hydroxide, ammonia, or similar, and the obtained water-based dispersion preferably has a pH value of 6-10.

By using the above-explained resin emulsion and the water insoluble polymer covered colorant in combination, it is possible to prevent a lack of coloring ability and deterioration of glossiness on a glossy medium, that can occur as the increase of the ratio of the colorant to the water insoluble polymer. Also, with the increase of the content of the resin component in the ink composition, the ink composition can exhibit improved fixability, as well as improved rubbing resistance in terms of gloss change, etc.

From the viewpoint of efficient acquisition of appropriate inkjet property values, reliability (in terms of nozzle clogging and discharge stability, etc.), fixability, and glossiness, etc., the content of the resin emulsion in the color ink compositions is preferably within the range of 0.1 to 5 weight %.

According to the findings of the inventors, since the ink set according to this embodiment has different color ink compositions containing different resin emulsions with different properties, the ink set can achieve gloss with better balance, higher image quality, better fixability and better reliability than an ink set having ink compositions containing resin emulsions with the same properties.

Other Ink Constituents

Each ink composition used for the ink set according to this embodiment preferably contains at least water, a water soluble organic compound, a pH regulator, and a nonionic surfactant.

The water contained in the ink composition used in this embodiment is the main solvent, and is preferably purified water or ultrapure water such as ion-exchange water, ultrafiltrate, reverse-osmosis water, or distilled water, etc. In particular, it is preferable to use water subjected to sterilization treatment using ultraviolet exposure or hydrogen peroxide addition, so that fungus and bacteria generation can be prevented, enabling the ink composition to be stored for quite a while.

Examples of the water soluble organic compound used in this embodiment include: polyhydric alcohols such as glycerin, 1,2,6-hexanetriol, trimethylolpropane, ethylene glycol, propylene glycol, diethylene glycol, triethylene glycol, tetraethylene glycol, pentaethylene glycol, dipropylene glycol, 2-butene-1,4-diol, 2-ethyl-1,3-hexanediol, 2-methyl-2,4-pentanediol, 1,2-octanediol, 1,2-hexanediol, 1,2-pentanediol, 1,5-pentanediol, and 4-methyl-1,2-pentanediol; saccharides such as glucose, mannose, fructose, ribose, xylose, arabinose, galactose, aldonic acid, glucitol, (sorbit), maltose, cellobiose, lactose, sucrose, trehalose, and maltotriose; saccharide alcohols; hyaluronic acids; so-called solid humectants such as trimethylolethane, trimethylolpropane, urea, and urea derivative; $C^{1-4}$ alkyl alcohols such as ethanol, methanol, butanol, propanol, and isopropanol; glycol ethers such as ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propylether, ethylene glycol mono-iso-propyl ether, diethylene glycol mono-iso-propylether, ethylene glycol mono-n-butyl ether, ethylene glycol mono-t-butyl ether, diethyl glycol mono-t-butyl ether, triethylene glycol monobutyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol mono-iso-propyl ether, dipropylene glycol monomethyl ether, dipropylene glycol monoethyl ether, dipropylene glycol mono-n-propyl ether, and dipropylene glycol mono-iso-propyl ether; 2-pyrolidon, N-methyl-2-pyrolidon; 1,3-dimethyl-2-imidazolidinone; formamide, acetamide; dimethyl sulfoxide; sorbit; sorbitan; acetin; diacetin; triacetin; and sulfolane. Those water soluble organic compounds may either be used alone, or two or more of them may be used together. The content of the water soluble organic compounds in the ink composition is preferably 10 to 50 weight %, for the purpose of maintaining appropriate ink composition property values (viscosity, etc.), printing quality, and reliability.

Moreover, in the ink compositions used in the present embodiment, at least polyhydric alcohols, solid humectants, and butyl ethers of glycol ether are used together as the water soluble organic compounds, so that ink compositions having good reliability, in terms of printing quality, discharge stability, and clogging recoverability, can be provided. The polyhydric alcohols and solid humectants are suitable for control of the water retention (moisture retention) and permeability of the ink compositions into a recording medium such as plain paper, and butyl ethers of glycol ether are suitable for control of the discharge stability and permeability of the ink compositions into a recording medium. By using them together, ink compositions with better reliability, such as printing quality, discharge stability, and clogging recoverability, can be provided.

More preferably, the water soluble organic compounds may be: a polyhydric alcohol that is combination of two or more types selected from glycerin, diethylene glycol, triethylene glycol, 1,5-pentanediol, and 1,2-hexanediol; a solid humectant that is trimethylolethan, trimethylolpropane, or urea; and a butyl ether of glycol ether that is diethylene glycol monobutyl ether or triethylene glycol monobutyl ether.

The ink compositions used for the ink set according to this embodiment preferably contain a pH regulator. The pH regulator may be alkali hydroxide such as lithium hydroxide, potassium hydroxide, and sodium hydroxide, and/or alkanolamine such as ammonia, triethanolamine, tripropanolamine, diethanolamine, and monoethanolamine. Particularly, at least one type of pH regulator selected from alkali metal hydroxide, ammonia, triethanolamine, and tripropanolamine is preferably contained, and the ink composition is preferably adjusted to pH 6-10. If the pH value is out of that range, the components of an inkjet printer are negatively affected, or the clogging recoverability deteriorates.

If necessary, collidine, imidazole, phosphoric acid, 3-(N-morpholino)propanesulfonic acid, tris-(hydroxymethyl)aminomethane, or boric acid may be used as a pH buffer.

Trialkanolamine added to the ink compositions can be used also as a glossiness imparting agent as desired, and is contained in the yellow, magenta, and cyan ink compositions to produce an image having uniform glossiness on a glossy recording medium.

If trialkanolamine is used as a gloss imparting agent in the ink compositions, from the viewpoint of its degradation into components of a printer, and ink viscosity and glossiness, the trialkanolamine content is preferably 10-50 weight %, more preferably 12-45 weight % in proportion to the 100 weight % of the pigment.

The trialkanolamine content in the total ink compositions is preferably 1 weight % or more, more preferably in the range of 1-3 weight %.

Although the trialkanolamine used as a gloss imparting agent in the ink compositions is not limited to a specific type, from the viewpoint of improvement in printing stability and glossiness, triethanolamine and/or tripropanolamine is preferably used.

If necessary, a surfactant, defoaming agent, antioxidant, ultraviolet absorber, antiseptic and antifungal agents, etc., may be added in the ink compositions used in the present embodiment.

Examples of the surfactants include anionic surfactants, cationic surfactants, ampholytic surfactants, and nonionic surfactants. It is particularly preferable to use a nonionic surfactant for the purpose of acquiring ink compositions with less foam formation.

More specific examples of the nonionic surfactants include acetylene glycol based surfactants; acetylene alcohol based surfactants; ether type surfactants such as polyoxyethylene nonylphenyl ether, polyoxyethylene octylphenyl ether, polyoxyethylene dodecylphenyl ether, polyoxyethylene alkylallyl ether, polyoxyethylene oleyl ether, polyoxyethylene lauryl ether, polyoxyethylene alkyl ether, and polyoxyalkylene alkyl ether; ester type surfactants such as polyoxyethylene oleic acid, polyoxyethylene oleic acid ester, polyoxyethylene distearic acid ester, sorbitan laurate, sorbitan monostearate, sorbitan monooleate, sorbitan sesquioleate, polyoxyethylene monooleate, and polyoxyethylene stearate; polyether-modified siloxane-based surfactants e.g., dimethylpolysiloxane; and other fluorine-containing surfactants such as alkyl ester having a fluorine atom and perfluoroalkyl carboxylate. These nonionic surfactants may be used alone or in a combination of two or more types.

Among those nonionic surfactants, acetylene glycol surfactant and/or polyether-modified siloxane-based surfactant is preferably used, because they exhibit less foam formation and excellent antifoaming property.

More specific examples of acetylene glycol based surfactants include 2,4,7,9-tetramethyl-5-decyne-4,7-diol; 3,6-dimethyl-4-octyne-3,6-diol; and 3,5-dimethyl-1-hexyn-3-ol. Also, commercially manufactured products may be used, examples of which include SURFYNOL 104, SURFYNOL 82, SURFYNOL 465, SURFYNOL 485 and SURFYNOL TG (from Air Products and Chemicals, Inc.), and OLFINE STG and OLFINE E1010 (from Nisshin Chemical Industry Co., Ltd.). More specific examples of polyether-modified siloxane-based surfactants include BYK-345, BYK-346, BYK-347, BYK-348 and UV3530 (from BYK-Chemie Japan K.K.). A plurality of them may be used in the ink compositions. The ink surface tension is preferably adjusted to 20-40 mN/m, and the content in each ink composition is 0.1-3.0 weight %.

Examples of antioxidants and ultraviolet absorbers include: allophanates such as allophanate and methyl allophanate; biurets such as biuret, dimethyl biuret and tetramethyl biuret; L-ascorbic acid and its salts; TINUVIN 328, 900, 1130, 384, 292, 123, 144, 622, and 770; IRGACOR 252 and 153; IRGANOX 1010, 1076, and 1035, and MD 1024 manufactured by Nihon Ciba-Geigy K.K.; and lanthanide oxides, etc.

Examples of antiseptic and antifungal agents include: sodium benzoate, sodium pentachlorophenol, sodium-2-pyridinethiol-1-oxide, sodium sorbate, sodium dehydroacetate, and 1,2-benzisothiazoline-3-on (PROXEL CRT, PROXEL BDN, PROXEL GXL, PROXEL XL-2, and PROXEL TN manufactured by Avecia Limited).

The ink compositions used in the ink set according to this embodiment can be prepared in the same manner as conventional ink by using known devices, such as a ball mill, sand mill, attritor, basket mill, or roll mill, etc. In the process of preparation, coarse particles are preferably removed to prevent nozzle clogging. Coarse particles are removed by filtering the ink obtained from combining the above described constituents through a filter such as a membrane filter or mesh filter to remove preferably particles with a diameter of 10 µm or more, and more preferably those with a diameter of 5 µm or more.

Recording Method

An ink set according to this embodiment is suited for use in, for example, pens and other such writing materials, as well as stamps, and, in particular, it is suited for use when recording something on a recording medium via an inkjet recording system. The inkjet recording system used here means a method using an inkjet recording apparatus, whereby each ink composition in an ink set is discharged from fine nozzles as droplets, and the droplets are adhered to a recording medium. Specific examples are described below.

The first inkjet recording method is an electrostatic suction type, in which recording is performed by applying an intense electric field between the nozzles and an acceleration electrode placed in front of the nozzles to sequentially discharge ink droplets from the nozzles, and providing a print information signal to deflection electrodes while the ink droplets are flying between the deflection electrodes, or by discharging ink droplets according to a print information signal without deflecting the ink droplets.

The second method is a type in which recording is performed by applying pressure to ink liquid with a small pump and mechanically vibrating nozzles with a crystal oscillator or the like to forcedly discharge ink droplets. The ink droplets are charged when they are discharged, and a print information signal is given to deflection electrodes while the ink droplets are flying between the deflection electrodes.

The third method is a type using piezoelectric devices in which ink droplets are discharged to perform recording by simultaneously applying pressure and giving a print information signal to the ink liquid.

The fourth method is a type in which ink volume is drastically expanded by the action of thermal energy. In this method, ink droplets are discharged to perform recording by using a microelectrode to heat the ink according to a print information signal, making it foam.

Any of the above described methods may be used as the inkjet recording method using the ink set according to this embodiment.

Recorded Material

A recorded material according to this embodiment is a material made by recording something on a recording medium using at least the above-explained ink set. Since the ink set according to this embodiment is used, the recorded material exhibits excellent quality, i.e., good coloring ability, good printing quality and good fixability.

Various types of recording media can be used, examples of which include inkjet-only paper (such as matte paper and glossy paper), plain paper, printing paper, and films.

Example 1

Preparation of Colorant Dispersed Solutions for a Black Ink Composition

A colorant dispersed solution containing a self-dispersing pigment as dispersed particles was prepared in the manner described below. As for the particle diameter, the volume mean particle size value was used, which was obtained by measuring the particle size distribution using a MICROTRAC UPA150 (from Microtrac Inc.).

Dispersed Solution B1

100 g of MA8 (product name; manufactured by Mitsubishi Chemical Corporation), which is commercial carbon black, was mixed into 500 g of water, and was ground by a ball mill having zirconia beads. 500 g of sodium hypochlorite (available chlorine concentration: 12%) was dripped into the resulting solution, and that solution was boiled for ten hours while being stirred, performing wet oxidation. The above obtained dispersed undiluted solution was filtered with glass fiber paper GA-100 (product name; manufactured by Advantec Toyo Kaisha, Ltd.), and was cleansed with water. The thus obtained wet cake was re-dispersed into 5 kg of water, desalinated and purified with a reverse osmosis membrane until its conductivity was 2 mS/cm, and concentrated until the pigment concentration was 15 weight %, resulting in dispersed solution B1. The volume mean particle size of the pigment in this dispersed solution was 120 nm.

Dispersed Solution B2

20 g of S170 (product name; manufactured by Degussa Japan Co., Ltd.), which is commercial carbon black, was mixed into 500 g of water, and was dispersed with a domestic mixer for five minutes. The obtained liquid was prepared in a 3-liter glass container equipped with a stirrer and stirred by that stirrer, while ozone-containing gas of 8 weight % ozone concentration was introduced at 500 cc/minute. Here, an electrolysis-generating ozonizer, manufactured by Permelec Electrode Ltd., was used to generate ozone. The obtained dispersed undiluted solution was filtered with glass fiber filter paper GA-100 (product name; manufactured by Advantec Toyo Kaisya, Ltd.), 0.1 N potassium hydroxide solution was added until the pigment concentration became 15 weight %, and the resulting solution was concentrated while its pH was adjusted to 9, resulting in dispersed solution B2. The volume mean particle size of the pigment in this dispersed solution was 90 nm.

Dispersed Solution B3

A commercially manufactured black pigment dispersed solution, CAB-O-JET 300 (product name, from Cabot Corporation, pigment solid content being 15 weight %) was used. The volume mean particle size of the pigment in this dispersed solution was 140 nm.

Preparation of Colorant Dispersed Solutions for a Color Ink Composition

A colorant dispersed solution containing a colorant covered with a water insoluble polymer as dispersed particles was prepared based on the following method. As for the particle diameter, the volume mean particle size value, which was obtained by measuring the particle size distribution using a Microtrac UPA150 (from Microtrac Inc.), was used.

Synthesis of Water Insoluble Polymers 1 to 3

20 parts by weight of organic solvent (methyl ethyl ketone), 0.03 parts by weight of polymerization chain transfer agent (2-mercaptoethanol), a polymerization initiator, and monomers shown in Table 1 were prepared in a reaction container in which sufficient nitrogen gas replacement had taken place, and polymerized while being stirred at 75° C. 0.9 parts by weight of 2,2'-azobis (2,4-dimethyl valeronitrile) dissolved in 40 parts by weight of methyl ethyl ketone was added to 100 parts by weight of monomer constituents and matured at 80° C. for an hour, obtaining desired water insoluble polymers. The numeric values shown in Table 1 mean the proportion (%) of the respective monomer constituents in the total amount (100%) of a monomer mixture.

TABLE 1

| Relative proportion in monomer mixture (%) | Water-insoluble polymer 1 | Water-insoluble polymer 2 | Water-insoluble polymer 3 |
|---|---|---|---|
| Methacrylic acid | 20 | 15 | 20 |
| Styrene monomer | 45 | 30 | 40 |

TABLE 1-continued

| Relative proportion in monomer mixture (%) | Water-insoluble polymer 1 | Water-insoluble polymer 2 | Water-insoluble polymer 3 |
|---|---|---|---|
| Benzyl methacrylate | | 20 | |
| Polyethylene glycol monomethacrylate (EO = 15) | 5 | 10 | |
| Polypropylene glycol monomethacrylate (PO = 9) | | 10 | 25 |
| Polyethylene glycol-propylene glycol monomethacrylate (EO = 5, PO = 7) | 10 | | 5 |
| Styrene macromonomer | 20 | 15 | 10 |

EO: Ethylene oxide
PO: Propylene oxide

Dispersed Solution Y1

5 parts by weight of the substance obtained by performing reduced-pressure drying on polymer solution obtained as water insoluble polymer 1 was dissolved in 15 parts by weight of methyl ethyl ketone, and neutralized with aqueous sodium hydroxide. 15 parts by weight of C. I. Pigment Yellow 74 was also added, and the solution was mixed with a disperser while water was added.

After 100 parts by weight of ion-exchange water was added to the above obtained mixed matter and that mixed matter was stirred, methyl ethyl ketone was removed at 60° C. under reduced pressure, and some water was also removed, obtaining water-based yellow pigment dispersion with 20 weight % solid concentration (pigment: water insoluble polymer=1: 0.3). The volume mean particle size of the pigment in this dispersion was 110 nm.

Dispersed Solution Y2

9 parts by weight of the substance obtained by performing reduced-pressure drying on polymer solution obtained as water insoluble polymer 2 was dissolved in 45 parts by weight of methyl ethyl ketone, and neutralized using aqueous sodium hydroxide. 18 parts by weight of C. I. Pigment Yellow 128 was also added, and mixed by a disperser while water was added.

After 120 parts by weight of ion-exchange water was added to the above obtained mixed matter and that mixed matter was stirred, methyl ethyl ketone was removed at 60° C. under reduced pressure, along with some water, resulting in a water-based yellow pigment dispersion with 20 weight % solid concentration (pigment: water insoluble polymer=1:0.5). The volume mean particle size of the pigment in this dispersion was 80 nm.

Dispersed Solution Y3

6 parts by weight of the substance obtained by performing reduced-pressure drying on polymer solution obtained as water insoluble polymer 3 was dissolved in 20 parts by weight of methyl ethyl ketone, and neutralized using aqueous sodium hydroxide. 10 parts by weight of C. I. Pigment Yellow 180 was also added, and mixed by a disperser while water was added.

After 100 parts by weight of ion-exchange water was added to the above obtained mixed matter and that mixed matter was stirred, methyl ethyl ketone was removed at 60° C. under reduced pressure, along with some water, resulting in a water-based yellow pigment dispersion with 20 weight % solid concentration (colorant: water insoluble polymer=1:0.6). The volume mean particle size of the pigment in this dispersion was 100 nm.

Dispersed Solution M1

Dispersed solution M1 was obtained in the same manner as dispersed solution Y1, except that C. I. Pigment Red 122 was used instead of C. I. Pigment Yellow 74. The volume mean particle size of the pigment in this dispersion was 100 nm.

Dispersed Solution M2

Dispersed solution M2 was obtained in the same manner as dispersed solution Y2, except that C. I. Pigment Violet 19 was used instead of C. I. Pigment Yellow 128, and the weight ratio of pigment to water insoluble polymer was changed to 1:0.2. The volume mean particle size of the pigment in this dispersion was 90 nm.

Dispersed Solution M3

Dispersed solution M3 was obtained in the same manner as dispersed solution Y3, except that C. I. Pigment Red 209 was used instead of C.I. Pigment Yellow 180, and the weight ratio of pigment to water insoluble polymer was changed to 1:0.15. The volume mean particle size of the pigment in this dispersion was 120 nm.

Dispersed Solution C1

Dispersed solution C1 was obtained in the same manner as dispersed solution Y1, except that C. I. Pigment Blue 15:3 was used instead of C. I. Pigment Yellow 74. The volume mean particle size of the pigment in this dispersion was 80 nm.

Dispersed Solution C2

Dispersed solution C2 was obtained in the same manner as dispersed solution Y2, except that C.I. Pigment Blue 15:1 was used instead of C.I. Pigment Yellow 128, and the weight ratio of pigment to water insoluble polymer was changed to 1:0.8. The volume mean particle size of the pigment in this dispersion was 85 nm.

Dispersed Solution C3

Dispersed solution C3 was obtained in the same manner as dispersed solution Y3, except that C.I. Pigment Blue 15:4 was used instead of C.I. Pigment Yellow 180, and the weight ratio of pigment to water insoluble polymer was changed to 1:1. The volume mean particle size of the pigment in this dispersion was 100 nm.

Preparation of Resin Emulsions

Resin emulsions used for each color ink composition and black ink composition were prepared in accordance with the below processes. In the processes, whether a film-like structure was formed or not was judged under visual observation of the result after the emulsion was applied thinly onto an aluminum plate in an environment of around 25° C. indoor ambient temperature. The weight-average molecular weight was measured via gel permeation chromatography (GPC) based molecular weight analysis. Also, as for the particle diameter, the volume mean particle size value was used, which was obtained by measuring the particle size distribution using a MICROTRAC UPA150 (from Microtrac Inc.).

Resin Emulsion 1

800 g of ion-exchange water and 1 g of sodium lauryl sulfate were prepared into a reaction container equipped with an stirrer, reflux condenser, dropper, and thermometer, and were heated to 75° C. while being stirred together with nitrogen replacement. The inner temperature was kept at 75° C., and 6 g of potassium persulfate was added as a polymerization initiator. After that dissolved, an emulsified product prepared in advance by adding, while being stirred, 20 g of acrylamide, 600 g of methyl methacrylate, 215 g of butyl acrylate, 30 g of methacrylic acid, and 5 g of triethylene glycol diacrylate to 450 g of ion-exchange water and 2 g of sodium lauryl sulfate was continuously dripped into the reaction solution for five hours. After the dripping, the solution was matured for three hours. After the thus obtained aqueous emulsion was cooled down to normal temperature, ion-exchange water and aqueous sodium hydroxide were added, and its solid matter content and pH were adjusted respectively to 30 weight % and 8.

It was confirmed that the obtained resin emulsion did not form a film-like structure at a temperature of 40° C. Also, the weight-average molecular weight was 300000, and the volume mean particle size was 80 nm.

Resin Emulsion 2

1000 g of ion-exchange water and 6.5 g of sodium lauryl sulfate were prepared into a reaction container equipped with an stirrer, reflux condenser, dropper, and thermometer, and were heated to 70° C. while being stirred together with nitrogen replacement. The inner temperature was kept at 70° C., and 4 g of potassium peroxide was added as a polymerization initiator. After that dissolved, an emulsified product prepared in advance by adding, while being stirred, 20 g of acrylamide, 550 g of styrene, 200 g of butyl acrylate, 30 g of methacrylic acid, and 1 g of triethylene glycol diacrylate to 450 g of ion-exchange water and 2 g of sodium lauryl sulfate was continuously dripped into the reaction solution for four hours. After the dripping, the solution was matured for three hours.

After the thus obtained resin emulsion was cooled down to normal temperature, ion-exchange water and ammonia water were added, and its solid matter content and pH were adjusted respectively to 15 weight % and 8.

It was confirmed that the obtained resin emulsion did not form a film-like structure at a temperature of 40° C. Also, the weight-average molecular weight was 500000, and the volume mean particle size was 40 nm.

Resin Emulsion 3

900 g of ion-exchange water and 3 g sodium lauryl sulfate were prepared in a reaction container equipped with an stirrer, reflux condenser, dropper, and thermometer, and were heated to 70° C. while being stirred together with nitrogen replacement. The inner temperature was kept at 70° C., and 4 g of potassium persulfate was added thereto as a polymerization initiator. After that dissolved, an emulsified product prepared by adding in advance, while being stirred, 20 g of acrylamide, 300 g of styrene, 640 g of butyl acrylate, 30 g of methacrylic acid, and 5 g of triethylene glycol diacrylate to 450 g of ion-exchange water and 3 g of sodium lauryl sulfate was continuously dripped into the reaction solution for four hours. After the dripping, the solution was matured for three hours. After the thus obtained aqueous emulsion was cooled down to normal temperature, ion-exchange water and 5% aqueous sodium hydroxide were added, and its solid matter content and pH were adjusted respectively to 30 weight % and 8.

It was confirmed that the obtained resin emulsion did not form a film-like structure at a temperature of 40° C. Also, the weight-average molecular weight was 450000, and the volume mean particle size was 120 nm.

Resin Emulsion 4

900 g of ion-exchange water and 3 g sodium lauryl sulfate were prepared in a reaction container equipped with an stirrer, reflux condenser, dropper, and thermometer, and were heated to 70° C. while being stirred together with nitrogen replacement. The inner temperature was kept at 70° C., and 4 g of potassium persulfate was added thereto as a polymerization initiator. After that dissolved, an emulsified product prepared by adding in advance, while being stirred, 20 g of acrylamide, 130 g of styrene, 780 g of 2-ethylhexyl acrylate, 30 g of methacrylic acid, and 2 g of ethylene glycol diacrylate to 450 g of ion-exchange water and 3 g of sodium lauryl sulfate was continuously dripped into the reaction solution for four hours. After the dripping, the solution was matured for three hours. After the thus obtained aqueous emulsion was cooled down to normal temperature, ion-exchange water and ammonia water were added, and its solid matter content and pH were adjusted respectively to 15 weight % and 8.

It was confirmed that the obtained resin emulsion formed a film-like structure at a temperature of 40° C. Also, the weight-average molecular weight was 250000, and the volume mean particle size was 40 nm.

Resin Emulsion 5

900 g of ion-exchange water and 3 g sodium lauryl sulfate were prepared in a reaction container equipped with an stirrer, reflux condenser, dropper, and thermometer, and were heated to 70° C. while being stirred together with nitrogen replacement. The inner temperature was kept at 70° C., and 4 g of potassium persulfate was added thereto as a polymerization initiator. After that dissolved, an emulsified product prepared by adding in advance, while being stirred, 20 g of acrylamide, 300 g of styrene, 640 g of butyl acrylate, and 30 g of methacrylic acid to 450 g of ion-exchange water and 3 g of sodium lauryl sulfate was continuously dripped into the reaction solution for four hours. After the dripping, the solution was matured for three hours. After the thus obtained aqueous emulsion was cooled down to normal temperature, ion-exchange water and 5% aqueous sodium hydroxide were added, and its solid matter content and pH were adjusted respectively to 30 weight % and 8.

It was confirmed that the obtained resin emulsion formed a film-like structure at a temperature of 40° C. Also, the weight-average molecular weight was 300000, and the volume mean particle size was 120 nm.

Polymers constituting a resin emulsion 6 and a resin emulsion 7 can respectively be prepared by using the monomers shown in Table 2 below and following the above-explained steps for the synthesis of the water insoluble polymers 1 to 3 used for the colorant dispersions for a color ink composition. Note that each value in Table 2 shows the proportion (%) of each monomer relative to the total amount (100%) of the monomer mixture.

TABLE 2

| Relative proportion in monomer mixture (%) | Polymer for resin emulsion 6 | Polymer for resin emulsion 7 |
|---|---|---|
| Methacrylic acid | 20 | 15 |
| Styrene monomer | 45 | 30 |
| Benzyl methacrylate | | 10 |
| Polyethylene glycol monomethacrylate (EO = 15) | 5 | 20 |
| Polypropylene glycol monomethacrylate (PO = 9) | | 15 |
| Polyethylene glycol-propylene glycol monomethacrylate (EO = 5, PO = 7) | 10 | |
| Styrene macromonomer | 20 | 10 |

EO: Ethylene oxide
PO: Propylene oxide

Resin Emulsion 6

5 parts by weight of the substance obtained by performing reduced-pressure drying on polymer solution obtained as water insoluble polymer for resin emulsion 6 was dissolved in 15 parts by weight of methyl ethyl ketone, and neutralized using aqueous sodium hydroxide. Then, after 100 parts by weight of ion-exchange water was added to the above neutralized matter and stirred, methyl ethyl ketone was removed at a temperature of 60° C. under reduced pressure. Furthermore, some water was removed, resulting in resin emulsion 6 with 15 weight % solid concentration.

It was confirmed that the obtained resin emulsion formed a film-like structure at a temperature of 40° C. Also, the weight-average molecular weight was 200000, and the volume mean particle size was 120 nm.

Resin Emulsion 7

Polymer solution prepared as water insoluble polymer for resin emulsion 7 was subjected to the same steps as in resin emulsion 6 above, and as a result, resin emulsion 7 with 15 weight % solid concentration was obtained.

It was confirmed that the obtained resin emulsion formed a film-like structure at a temperature of 40° C. Also, the weight-average molecular weight was 150000, and the volume mean particle size was 90 nm.

Preparation of Ink Compositions

Constituents were mixed in the proportions shown in Tables 3 and 4. The mixed liquid, after being stirred for two hours, was filtered with a stainless filter with an approximate 5 μm hole diameter to prepare the ink compositions. Amounts added are shown by weight % in Tables 3 and 4. Also, a value in brackets means the solid content of the relevant pigment. The amounts of pigment dispersed liquid and polymer shown in the table are solid matter content. In addition, ion-exchange water is described as "Bal." which means that ion-exchange water was added to each ink composition to constitute the balance of the ink composition, i.e., the total amount less the amounts of the other components.

TABLE 3

| | Ink structure | | | | | | | |
|---|---|---|---|---|---|---|---|---|
| | Ink B1 | Ink B2 | Ink B3 | Ink B4 | Ink Y1 | Ink Y2 | Ink Y3 | Ink Y4 |
| Dispersed solution B1 | 30 (4.5) | | | | | | | |
| Dispersed solution B2 | | 40 (6) | 50 (7.5) | | | | | |
| Dispersed solution B3 | | | | 30 (4.5) | | | | |
| Dispersed solution Y1 | | | | | 30 (4.6) | | | 30 (4.6) |
| Dispersed solution Y2 | | | | | | 40 (5.3) | | |
| Dispersed solution Y3 | | | | | | | 30 (3.8) | |
| Resin emulsion 1 | | 10 | | | 6 | | | |
| Resin emulsion 2 | | | | | | 15 | | |
| Resin emulsion 3 | 10 | 8 | | | | | | 6 |
| Resin emulsion 4 | 30 | | 30 | | | | | |
| Resin emulsion 5 | | 5 | 5 | | | | | |
| Resin emulsion 6 | | | | | | | | 10 |
| Resin emulsion 7 | | | | | | | | |
| Glycerin | 10 | 10 | 10 | 10 | 10 | 10 | 15 | 10 |
| Triethylene glycol | 2 | 5 | 5 | 5 | 5 | 3 | | 5 |
| 1,2-hexanediol | 1 | 1 | 1 | 1 | 1 | 1 | 2 | 1 |
| Trimethylol-propane | 2 | 4 | | 2 | 2 | 4 | | 2 |
| Urea | | | 2 | | | | 3 | |
| TEGmBE | 2 | 2 | 2 | 2 | 2 | 2 | 2 | 2 |
| 2-pyrrolidone | 1 | 1 | 1 | 1 | 1 | | 2 | 1 |
| Olfine E1010 | 1 | 1 | 1 | 1 | 1 | 0.5 | 0.7 | 1 |
| Surfynol 104 | 0.5 | 0.5 | 0.1 | 0.5 | 0.5 | 0.3 | 0.7 | 0.5 |
| Potassium hydroxide | | 0.05 | | | | | | |

TABLE 3-continued

|  | Ink structure | | | | | | | |
|---|---|---|---|---|---|---|---|---|
|  | Ink B1 | Ink B2 | Ink B3 | Ink B4 | Ink Y1 | Ink Y2 | Ink Y3 | Ink Y4 |
| Triethanolamine | 1 |  | 0.5 | 1 | 1 | 1 | 1 | 1 |
| EDTA | 0.02 | 0.02 | 0.02 | 0.02 | 0.02 | 0.02 | 0.02 | 0.02 |
| Proxel XL2 | 0.3 | 0.3 | 0.3 | 0.3 | 0.3 | 0.3 | 0.3 | 0.3 |
| Ion-exchange water | Bal. | Bal. | Bal. | Bal. | Bal. | Bal. | Bal. | Bal. |
| Average particle diameter (nm) | 120 | 90 | 90 | 140 | 110 | 80 | 100 | 110 |

TEGmBE: Triethylene glycol monobutylether
EDTA: Disodium ethylenediaminetetraacetate

TABLE 4

|  | Ink structure | | | | | | | | |
|---|---|---|---|---|---|---|---|---|---|
|  | Ink M1 | Ink M2 | Ink M3 | Ink M4 | Ink C1 | Ink C2 | Ink C3 | Ink C4 | Ink C5 |
| Dispersed solution M1 | 30 (4.6) |  |  | 30 (4.6) |  |  |  |  |  |
| Dispersed solution M2 |  | 30 (5) |  |  |  |  |  |  |  |
| Dispersed solution M3 |  |  | 25 (4.3) |  |  |  |  |  |  |
| Dispersed solution C1 |  |  |  |  | 25 (3.8) |  |  |  | 25 (3.8) |
| Dispersed solution C2 |  |  |  |  |  | 36 (4) | 36 (4) |  |  |
| Dispersed solution C3 |  |  |  |  |  |  |  | 30 (3) |  |
| Resin emulsion 1 |  |  |  |  |  |  |  |  |  |
| Resin emulsion 2 |  |  |  |  |  | 10 |  |  |  |
| Resin emulsion 3 |  |  |  |  |  |  |  |  |  |
| Resin emulsion 4 |  |  | 3 |  |  |  |  |  |  |
| Resin emulsion 5 |  |  |  |  |  |  |  | 6 |  |
| Resin emulsion 6 | 5 |  |  |  | 10 |  |  |  |  |
| Resin emulsion 7 |  | 2.5 |  |  |  | 15 |  |  |  |
| Glycerin | 10 | 10 | 10 | 10 | 10 | 10 | 10 | 10 | 10 |
| Triethylene glycol | 4 | 2 |  | 5 | 7 | 5 | 5 | 5 | 9 |
| 1,2-hexanediol | 1 | 1 | 2 | 1 | 1 | 1 | 1 | 1 | 1 |
| Trimethylolpropane | 2 | 4 |  | 2 | 2 | 4 | 4 | 2 | 2 |
| Urea |  |  | 3 |  |  |  |  |  |  |
| TEGmBE | 2 | 2 | 2 | 2 | 2 | 2 | 2 | 2 | 2 |
| 2-pyrrolidone | 1 |  | 2 | 1 | 1 |  |  | 1 | 1 |
| Olfine E1010 | 1 | 0.5 | 0.7 | 1 | 1 | 0.5 | 0.5 | 1 | 1 |
| Surfynol 104 | 0.5 | 0.3 | 0.7 | 0.5 | 0.5 | 0.3 | 0.3 | 0.5 | 0.5 |
| Triethanolamine | 1 | 1 | 1 | 1 | 1 | 1 | 1 | 1 | 1 |
| EDTA | 0.02 | 0.02 | 0.02 | 0.02 | 0.02 | 0.02 | 0.02 | 0.02 | 0.02 |
| Proxel XL2 | 0.3 | 0.3 | 0.3 | 0.3 | 0.3 | 0.3 | 0.3 | 0.3 | 0.3 |
| Ion-exchange water | bal. | bal. | bal. | bal. | bal. | bal. | bal. | bal. | bal. |
| Average particle diameter (nm) | 100 | 90 | 120 | 100 | 80 | 85 | 85 | 100 | 80 |

TEGmBE: Triethylene glycol monobutylether
EDTA: Disodium ethylenediaminetetraacetate Composition of Ink Sets The ink compositions prepared as described above were combined as shown in Table 5 to prepare examples of ink sets (ink sets 1 to 8) and comparative examples of ink sets (ink sets 9 and 10).

TABLE 5

|  | Ink set | Black ink | Yellow ink | Magenta ink | Cyan ink |
|---|---|---|---|---|---|
| Examples | Ink set 1 | Ink B1 | Ink Y1 | Ink M1 | Ink C1 |
|  | Ink set 2 | Ink B2 | Ink Y1 | Ink M1 | Ink C2 |
|  | Ink set 3 | Ink B3 | Ink Y1 | Ink M2 | Ink C3 |
|  | Ink set 4 | Ink B4 | Ink Y1 | Ink M2 | Ink C1 |
|  | Ink set 5 | Ink B1 | Ink Y2 | Ink M2 | Ink C3 |
|  | Ink set 6 | Ink B1 | Ink Y3 | Ink M1 | Ink C2 |
|  | Ink set 7 | Ink B2 | Ink Y1 | Ink M3 | Ink C4 |
|  | Ink set 8 | Ink B3 | Ink Y4 | Ink M1 | Ink C2 |
| Comparative Examples | Ink set 9 | Ink B1 | Ink Y4 | Ink M4 | Ink C4 |
|  | Ink set 10 | Ink B2 | Ink Y1 | Ink M1 | Ink C5 |

Test Example 1

Evaluation of 20-Degree Specular Gloss Value

Using each of the ink sets 1 to 10 shown in Table 5, patch patterns of respective black, yellow, magenta, and cyan colors were formed on the recording media described below at 100% duty, using a PX-A550 inkjet printer (from Seiko Epson Corporation).

To measure the glossiness of each recorded material, a 20-degree specular gloss value was measured using a GM-268 gloss meter (from Konica Minolta Sensing Inc.).

A 60-degree gloss value is generally used as the index of the specular gloss of a printed material. However, the inventors found that a printed material having a high 60-degree gloss value is not always visually observed as a highly glossy material, i.e., a 60-degree gloss value does not always coincide with [human] observable glossiness. After some research, a gloss value at a view angle of 20 degrees was found to coincide with [human] observable glossiness, and accordingly, that gloss value at a view angle of 20 degrees was used as the index in the invention.

Recording Media
1. EPSON Photo Paper "Gloss" (from Seiko Epson Corporation)
2. EPSON Photo Glossy Paper (from Seiko Epson Corporation)
3. KODAK Premium Picture Paper (from Eastman Kodak Company)

Measurement was performed five times on each sample, and the mean value of the results was calculated. The 20-degree specular gloss value ($G_{20}$) was evaluated for the calculated mean values based on the following criteria. The evaluation results are shown in Table 6 below.

A: $60 \leq G_{20}$
B: $45 \leq G_{20} < 60$
C: $G_{20} < 45$

Test Example 2

Evaluation of Image Quality

Using each of the ink sets 1 to 10 shown in Table 5, a high-resolution standard color digital image (ISO/JIS-SCID, with a title of "PORTRAIT" (sample number 1, image evaluation identification number N1)), was printed on the recording media described below using a PX-A550 (from Seiko Epson Corporation).

Recording Media
1. EPSON Photo Paper "Gloss" (from Seiko Epson Corporation)
2. EPSON Photo Glossy Paper (from Seiko Epson Corporation)
3. KODAK Premium Picture Paper (from Eastman Kodak Company)
4. EPSON Photo Matte Paper (from Seiko Epson Corporation)
5. XEROX P (from Fuji Xerox Co., Ltd.)
6. XEROX 4024 (from Xerox Co.)

Using the so recorded materials as samples, the image quality of each sample was visually observed, and evaluated in accordance with the below standards. The evaluation results are shown in Table 6.

A: Good image quality on every recording medium
B: Looks rather blurred or thin, but generally good quality
C: Poor image quality Test Example 3

Optical Density (OD Value) Measurement

Using each of the ink sets 1 to 10 shown in Table 5, patch patterns of respective black, yellow, magenta, and cyan colors were formed on the recording media used in Test Example 2 at 100% duty, using a PX-A550, and the optical density (OD value) of each sample was measured regarding their patch portions, using a GRETAG density measure (from Gretag Macbeth AG). Measurement was performed five times on each sample, and mean values for the measurement results were calculated. The optical density (OD value) for the calculated mean OD values was evaluated based on the following criteria. The evaluation results are shown in Table 6.

A: 1.8. Mean OD value
B: 1.5. Mean OD value.1.8
C, 1.2. Mean OD value.1.5
D: 0.9. Mean OD value.1.2
E: Mean OD value.0.9

Test Example 4

Fixability Evaluation

Taking, from among the recorded materials made in Test Example 3, those made on the recording media 1, 4 and 5 as samples, fixability was evaluated with respect to those samples. Evaluation of the fixability was performed on each sample by marking a printed portion with a ZEBRA PEN 2 (Trademark) water-based yellow highlighter pen, manufactured by ZEBRA Co., Ltd., at 300 g/15 mm pen pressure after a lapse of an hour after printing, and visually observing the stain on the pen tip. The fixability was evaluated based on the following criteria. The evaluation results are shown in Table 6.

A: No stain even after two markings
B: No stain after one marking, but stain after two markings
C: Stain after one marking Test Example 5

Evaluation of Gloss Change

Taking, from among the recorded materials made in Test Example 3, those made on the recording media 1, 2 and 3 as samples, gloss change was evaluated with respect to those samples. The evaluation results are shown in Table 6.

A: No trace of finger rubbing found and no glossiness change.
B: Traces of finger rubbing found, but glossiness hardly changed
C: Traces of finger rubbing clearly found and glossiness changed.

Test Example 6

Evaluation of Preservability

With respect to each of the ink sets 1 to 10 shown in Table 5, their preservability was evaluated. Each ink set was left in a 70° C. environment for one week, with 50 g of the ink compositions being kept in an aluminum package. After one week had elapsed, each ink set was visually observed to check whether there was any foreign substance (deposited substance) in the ink compositions. Also, if no foreign substance was observed, the ink compositions were further checked for any change in their properties (viscosity, surface tension, pH value, and particle diameter). Then, each ink set was evaluated in accordance with the below criteria. The evaluation results are shown in Table 6.

A: No foreign substance and no change in properties observed.
B: No foreign substance observed, but slight change in properties observed.
C: Foreign substances observed, or considerable change in properties observed.

Test Example 7

Evaluation of Discharge Stability

With respect to each of the ink sets 1 to 10 shown in Table 5, discharge stability when discharged using an inkjet printer was evaluated. In this evaluation, any abnormality such as missing dots or ink bending that might occur during the printing from start to finish was observed. Also, if missing dots or ink bending was observed, the number of printer cleanings required to return to a normal printing condition was counted. Then, each ink set was evaluated in accordance with the below criteria. The evaluation results are shown in Table 6.
A: No abnormality observed, or one cleaning required.
B: 24 cleanings required.
C: 5 or more cleanings required.

Test Example 8

Evaluation of Clogging Recoverability

With respect to each of the ink sets 1 to 10 shown in Table 5, the ability to recover from any clogging that might happen when discharging the ink using an inkjet printer was evaluated. An ink cartridge filled with the ink compositions included in each ink set was set in a PX-V600 inkjet printer (from Seiko Epson Corporation), so that the printer head was filled with the ink compositions coming from the ink cartridge. After confirming that the ink compositions were discharged from all nozzles, the ink cartridge was removed, and the printer head was set at a position other than the home position (i.e., the printer head was not positioned at the cap of the printer, and thus not capped). Keeping the above state, the printer was left in a 40° C. environment for one week. After one week had elapsed, the number of cleanings required until the ink compositions were again discharging from all nozzles was counted, and evaluated in accordance with the below criteria. The evaluation results are shown in Table 6.
A: One cleaning required.
B: 2-5 cleanings required.
C: 6 or more cleanings required.

TABLE 6

|  |  | Ink set | | | | | | | | | |
|---|---|---|---|---|---|---|---|---|---|---|---|
|  |  | 1 | 2 | 3 | 4 | 5 | 6 | 7 | 8 | 9 | 10 |
| Test Example 1 | Recording medium 1 | A | A | B | A | A | B | A | B | B | A |
|  | Recording medium 2 | A | A | B | A | A | B | A | B | B | A |
|  | Recording medium 3 | A | A | B | B | A | B | A | B | B | A |
| Test Example 2 | Recording medium 1 | A | A | B | B | B | B | B | B | B | C |
|  | Recording medium 2 | A | A | B | B | B | B | B | B | B | C |
|  | Recording medium 3 | A | A | B | B | B | B | B | B | B | C |
|  | Recording medium 4 | A | A | A | B | A | A | A | A | A | A |
|  | Recording medium 5 | A | A | A | B | A | A | A | A | A | A |
|  | Recording medium 6 | A | A | A | B | A | A | A | A | A | A |
| Test Example 3 | Recording medium 1 | A | A | A | A | A | A | A | A | A | A |
|  | Recording medium 2 | A | A | A | A | A | A | A | A | A | A |
|  | Recording medium 3 | A | A | A | A | A | A | A | A | A | A |
|  | Recording medium 4 | B | B | B | C | B | B | B | B | B | B |
|  | Recording medium 5 | D | D | D | D | D | D | D | D | D | D |
|  | Recording medium 6 | D | D | D | D | D | D | D | D | D | D |
| Test Example 4 | Recording medium 1 | A | A | A | A | A | A | A | A | C | B |
|  | Recording medium 4 | A | A | B | A | A | A | A | B | B | A |
|  | Recording medium 5 | A | A | B | A | A | A | B | B | B | A |
| Test Example 5 | Recording medium 1 | A | A | A | A | B | A | B | B | C | C |
|  | Recording medium 2 | A | A | A | A | B | A | B | B | C | C |
|  | Recording medium 3 | A | A | A | A | B | A | B | B | C | B |
|  | Test Example 6 | A | A | A | A | A | A | A | A | A | A |
|  | Test Example 7 | A | A | A | B | A | A | A | A | A | A |
|  | Test Example 8 | A | A | B | B | A | A | B | B | B | A |

As described above, an ink set according to the invention can exhibit good coloring ability, glossiness and rubbing resistance when it is applied to various types of recording media (such as plain paper, matte paper, glossy paper and printing paper). Moreover, the ink set itself is very reliable, e.g., having good preservability and being less prone to clogging. Accordingly, the ink set is suited for use in inkjet recording systems.

What is claimed is:
1. An ink set comprising:
a black ink composition including a self-dispersing pigment and a resin emulsion, the resin emulsion being formed from a mixture of resin particulates that form a film-like structure at a temperature of 40° C. or lower, and resin particulates that do not form a film-like structure at a temperature of 40° C. or lower,
a yellow ink composition including an organic pigment covered with a water-insoluble polymer and a resin emulsion, the resin emulsion contained in the yellow ink composition being formed from a water insoluble polymer that does not form a film-like structure at a temperature of 40° C. or lower,
a magenta ink composition including an organic pigment covered with a water-insoluble polymer and a resin emulsion, and
a cyan ink composition including an organic pigment covered with a water-insoluble polymer and a resin emulsion wherein each of the resin emulsions contained in the magenta ink composition and in the cyan ink composition is formed from a polymer that forms a film like-like structure at a temperature of 40° C., wherein each of the resin emulsions contained in the magenta ink composition and in the cyan ink composition is formed from a polymer obtained by polymerizing the same monomers as those of the water-insoluble polymer of the magenta and cyan inks respectively, and wherein each of the resin emulsions contained in the magenta ink composition, and in, the cyan ink composition is formed from a block copolymer resin that is composed of monomers each having a hydrophobic group and monomers each having a hydrophilic group and contains at least a monomer having a salt formation group.

2. The ink set according to claim 1, wherein the weight ratio of the organic pigment to the water insoluble polymer contained in the color ink composition is within the range of 1:0.2 to 1:1.

3. The ink set according to claim 1, wherein the resin emulsion contained in the color ink composition is formed from a water insoluble polymer with a weight-average molecular weight of from 75,000 to 600,000.

4. The ink set according to claim 1, wherein the self-dispersing pigment included in the black ink composition is made from a carbon black pigment, the organic pigment contained in the yellow ink composition includes at least one selected from the group consisting of C. I. Pigment Yellow 74, C. I. Pigment Yellow 109, C. I. Pigment Yellow 110, C. I. Pigment Yellow 128, C. I. Pigment Yellow 138, C. I. Pigment Yellow 147, C. I. Pigment Yellow 150, C. I. Pigment Yellow 155, C. I. Pigment Yellow 180 and C. I. Pigment Yellow 188; the organic pigment contained in the magenta ink composition includes at least one selected from the group consisting of C. I. Pigment Red 122, C. I. Pigment Red 202, C. I. Pigment Red 207, C. I. Pigment Red 209, and C. I. Pigment Violet 19; and the organic pigment contained in the cyan ink composition includes at least one selected from the group consisting of C.I. Pigment Blue 15, C.I. Pigment Blue 15:1, C.I. Pigment Blue 15:2, C.I. Pigment Blue 15:3, C.I. Pigment Blue 15:4 and C.I. Pigment Blue 16.

5. The ink set according to claim 1,
wherein the resin emulsion contained in the yellow ink composition has a volume mean particle size of from 20 mm to 80 nm, and
wherein the resin emulsions contained in the magenta ink composition and the cyan ink composition both have a volume mean particle size of from 50 nm to 200 nm.

6. The ink set according to claim 1, wherein the resin emulsions of the respective black, yellow, magenta and cyan ink compositions have properties that differ from one another such that the ink set can achieve gloss with better balance than if the properties of the resin emulsions of the respective ink compositions were the same.

7. The ink set according to claim 1, wherein each of the ink compositions further contains at least water, a water soluble organic compound, a pH regulator, and a nonionic surfactant.

8. The ink set according to claim 7, wherein the water soluble compound includes at least a polyhydric alcohol, a solid humectant, and a butyl ether of a glycol ether.

9. The ink set according to claim 7, wherein the pH regulator is an alkali hydroxide and/or a trialkanolamine.

10. The ink set according to claim 7, wherein the nonionic surfactant is an acetylene glycol based surfactant and/or a polyether-modified siloxane based surfactant.

* * * * *